[12] United States Patent
Jacobs et al.

(10) Patent No.: US 7,472,396 B2
(45) Date of Patent: Dec. 30, 2008

(54) EXTENSIBLE EVENT NOTIFICATION MECHANISM

(75) Inventors: Paul E. Jacobs, La Jolla, CA (US); Stephen A. Sprigg, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 700 days.

(21) Appl. No.: 10/133,847

(22) Filed: Apr. 25, 2002

(65) Prior Publication Data
US 2003/0009602 A1 Jan. 9, 2003

Related U.S. Application Data

(60) Provisional application No. 60/292,114, filed on May 18, 2001.

(51) Int. Cl.
G06F 3/00 (2006.01)
G06F 9/44 (2006.01)
G06F 9/46 (2006.01)
G06F 13/00 (2006.01)
G06F 13/24 (2006.01)

(52) U.S. Cl. .................. 719/318; 710/260
(58) Field of Classification Search ................ 719/318; 714/48; 710/260
See application file for complete search history.

(56) References Cited

U.S. PATENT DOCUMENTS 5,621,892 A 4/1997 Cook
5,828,882 A * 10/1998 Hinckley ................ 719/318
6,185,613 B1 2/2001 Lawson et al.
6,367,034 B1 * 4/2002 Novik et al. ............. 714/39
6,611,877 B2 * 8/2003 Korn et al. .............. 719/318
6,681,245 B1 * 1/2004 Sasagawa ................ 709/206
6,782,541 B1 * 8/2004 Cohen et al. ............. 719/318
6,859,829 B1 * 2/2005 Parupudi et al. .......... 709/224
6,993,771 B1 * 1/2006 Hasha et al. ............. 719/318
2001/0056508 A1 * 12/2001 Arneson et al. .......... 709/318
2002/0059472 A1 * 5/2002 Wollrath et al. .......... 709/318
2003/0163598 A1 * 8/2003 Wilson et al. ............ 709/318

FOREIGN PATENT DOCUMENTS

EP 0528221 A2 2/1993

* cited by examiner

Primary Examiner—Meng-Ai An
Assistant Examiner—Qing-Yuan Wu
(74) Attorney, Agent, or Firm—James T. Hagler; Robert J. O'Connell; Thomas Rouse

(57) ABSTRACT

An extensible event notification system detects certain events, and notifies requestor programs that have registered to receive such notification. The system includes a notification manager, multiple event notifier programs, multiple requester programs, a map, and a notification dictionary. When loaded by the notification manager, each event notifier program detects certain prescribed events. When advised by notifier programs of events, the notification manger consults the map to identify the requester programs registered for those events and any applicable notification parameters. Then the notification manger loads the requestor programs registered for those events, and notifies them of the occurrence of the events according to the applicable notification parameters.

17 Claims, 3 Drawing Sheets

EXTENSIBLE EVENT NOTIFICATION MECHANISM

CROSS-REFERENCE TO RELATED APPLICATION

This application claims the benefit of U.S. Provisional Application Ser. No. 60/292,114, filed on May 18, 2001, which application is incorporated herein by reference in its entirety.

BACKGROUND OF THE INVENTION

I. Field of the Invention

The present invention relates to event detection and alert systems implemented in computer software.

II. Description of the Related Art

An interrupt is a signal from a device attached to a computer or from a program within the computer that causes the main program that operates the computer (the operating system) to stop and figure out what to do next. Many computers today are interrupt-driven. They start down the list of computer instructions in one program (perhaps an application such as a word processor) and keep running the instructions until either they cannot go any further, or an interrupt signal is sensed. After the interrupt signal is sensed, the computer either resumes running the program it was running or begins running another program.

Basically, a single computer can perform only one computer instruction at a time. But, because it can be interrupted, it can take turns in which programs or sets of instructions that it performs. This is known as multitasking. It allows the user to do a number of different things at the same time. The computer simply takes turns managing the programs that the user effectively starts. Of course, the computer operates at speeds that make it seem as though all of the user's tasks are being performed at the same time. (The computer's operating system is good at using little pauses in operations and user think time to work on other programs.)

An operating system usually has some code that is called an interrupt handler. The interrupt handler prioritizes the interrupts and saves them in a queue if more than one is waiting to be handled. The operating system has another little program, sometimes called a scheduler, which figures out which program to give control to next. An interrupt request will have a value associated with it that identifies it as a particular device.

Although beneficial in the single-processor context, the state of the art is not completely satisfactory for systems with many different programs that require varying degrees of notification of a variety of different events. In current implementations, notifications are typically "hard-wired" in that they are provided through specific function calls supported by the specific functional area responsible for the notification. There implementations lack any facility for dynamically extending the mechanism. Further, in order to add a new type of notification, a new set of application programmer interfaces must be developed.

Consequently, known event notification schemes are not completely adequate for some applications due to certain unsolved problems.

SUMMARY OF THE INVENTION

Broadly, the present invention concerns an extensible event notification system that detects certain events, and notifies requestor programs that have registered for such notification. The system includes a notification manager, multiple event notifier programs, multiple requestor programs, a map, and notification dictionary.

Initially, each requester program submits a respective registration request to the notification manager. Each registration request is a request to receive notification of one or more future events in an event "class" associated with a particular notifier program. Each registration request includes a requester ID (identifying the requestor program) and a notifier ID (identifying the event notifier program corresponding to the event class for which registration is sought). The notification manager stores identification of the requesting programs in a map in association with contents of the registration requests.

At various times, the notification manager activates a number of event notifier programs, each corresponding to a particular event class. When a notifier program detects an event (from the event class that is detectable by the notifier program), it notifies the notification manager. In response, the notification manager takes action to advise the appropriate requesting programs of the event's occurrence. First, the notification manager accesses the map to identify all requesting programs that have submitted registration requests concerning activated notifier program. Then, the notification manager activates the identified requesting programs and sends them a representation of the occurred event. If desired, the notification manager may also deactivate the activated requesting programs at an appropriate time.

The foregoing features may be implemented in a number of different forms. For example, the invention may be implemented to provide a method of operating an extensible event notification system. In another embodiment, the invention may be implemented to provide an apparatus such as an extensible event notification system. In still another embodiment, the invention may be implemented to provide a signal-bearing medium tangibly embodying a program of machine-readable instructions executable by a digital data processing apparatus to operate an extensible event notification system as discussed herein. Another embodiment concerns logic circuitry having multiple interconnected electrically conductive elements configured to provide an extensible notification system of the invention described herein.

The invention affords its users with a number of distinct advantages. Chiefly, since registration occurs using requestor and notifier program IDs rather than pointers to these programs in memory, registration can occur regardless of whether the requestor or notifier programs exists in memory at the time of the registration. Advantageously, the notification is managed without any requirement for the requester program to be loaded and actively checking for the specific event. The invention also provides a number of other advantages and benefits, which should be apparent from the following description of the invention.

DETAILED DESCRIPTION

The nature, objectives, and advantages of the invention will become more apparent to those skilled in the art after considering the following detailed description in connection with the accompanying drawings.

Hardware Components & Interconnections

Overall Structure

Figure 1:
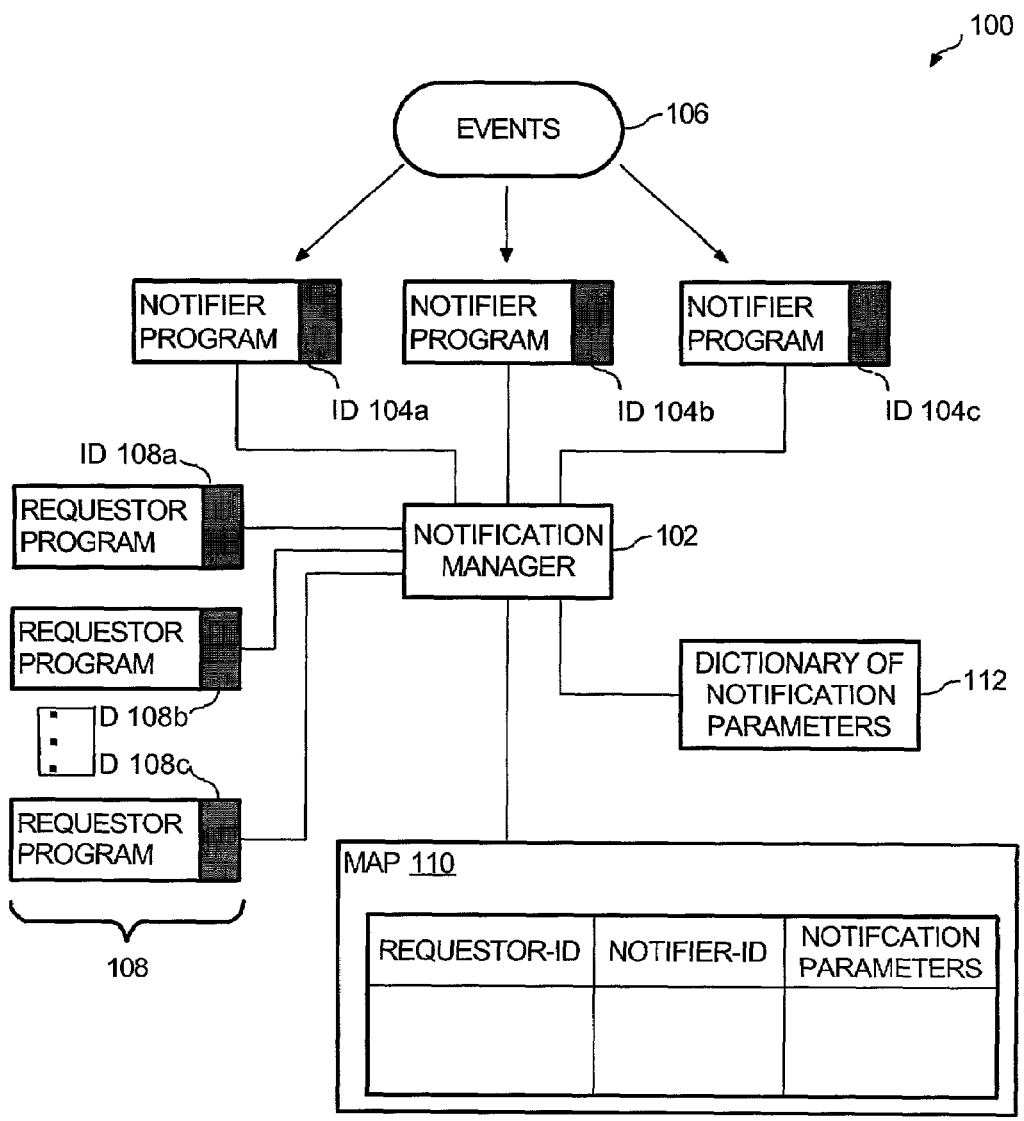
FIG. 1 is a block diagram of the hardware components and interconnections of an extensible event notification system, according to the invention.

One aspect of the invention concerns an extensible event notification system, which may be embodied by various hardware components and interconnections, with one example being described by the system 100 of FIG. 1. The system 100 includes a notification manager 102, multiple requestor programs 108, multiple notifier programs 104, a map 110, and dictionary 112.

Requestor Programs

The requestor programs 108 comprise software programs that perform various diverse functions, the details of which depend upon the application context of the system 100, e.g., wireless telephone, automotive computer, etc. Each requestor program is configured to take action in response to the occurrence of certain events 106. In order to receive notification of the events 106, the requestor programs 108 register with the notification manager 102, as described in greater detail below. Each requester program 108 has associated identifier (ID), shown by the IDs 108a-108c. In the present example, each requestor program ID comprises a different thirty-two bit binary number. Although shown with each requestor program, the associated ID may be alternatively stored elsewhere in a list, table, map, or other construct that associates requester programs with IDs 108a-108c.

Notifier Programs

The notifier programs 104 comprise software programs that detect the occurrence of various events 106. The events 106 may comprise hardware and/or software events occurring within the system 100 or external thereto, the exact nature of which depends upon the application context of the system 100. Some exemplary events include changes in configuration of hardware devices, expiration of times, arrival of prescribed times, completion of processing tasks, experience of particular hardware interrupts.

Each notifier program 104, as illustrated, is capable of detecting multiple different events. The events that are detectable by a particular notifier program 104 are referred to as the notifier program's "event class." Each notifier program 104 includes an ID, shown by the IDs 104a-104c. In the present example, each notifier IDs comprises a different thirty-two bit number. Although shown with each notifier program, the associated ID may be alternatively stored elsewhere in a list, table, map, or other construct that associates notifier programs with IDS 104a-104c. Each notifier program 104 serves to notify the notification manager 102 in response to detecting an event of that notifier program's event class.

Notification Manager

The notification manager 102, which is communicatively coupled to the notifier programs 104 and requestor programs 108, serves to receive registration requests from the requestor programs 108 and also receive event notifications from the notifier programs 104. The registration requests are requests from the requesting programs to receive notification of one or more future event types; each registration request includes the requestor program's ID 108a-108c and identification of the notifier program 104 corresponding to the desired event class. For each requestor program 108 seeking registration, the notification manager 102 stores the ID 108a-108c in a map 110, along with the corresponding notifier program ID, and a notification parameter.

Thus, whenever a notifier program 104 alerts the notification manager 102 to an event, the notification manager 102 first accesses the map 110 to identify all requesting programs 108 that have registered concerning the alerting notifier program. Accordingly, the notification manager 102 activates the identified requesting program and sends it a message identifying the event that has occurred.

Map

TABLE 1 (below) illustrates an exemplary configuration of the map 110.

TABLE 1

EXEMPLARY MAP 110

| REQUESTOR ID | NOTIFIER ID | NOTIFICATION PARAMETER |
|---|---|---|
| 11111111111111111111111111111111 | 00000000000000000000000000000000 | 1001 |
| 11111111111111111111111111111110 | 00000000000000000000000000000001 | 1100 |
| 11111111111111111111111111111100 | 00000000000000000000000000000011 | 1111 |

In this example, the map 110 includes a listing of each "registered" requesting program 108, that is, each requesting program 108 that has submitted a request to the notification manager 102 to receive notification of an event class. In the illustrated example, the map 110 identifies registered requesting programs 108 by their thirty-two bit ID. For each registration, the map 110 lists the notifier program 104 corresponding to the event class of that registration. In the illustrated example, the map 110 names each notifier program 104 by its thirty-two bit ID.

For each registered requestor program 108, the map 110 further lists a notification parameter. As explained in greater detail below, the notification parameters specify which events of the notifier program's class that the caller wishes to receive. In the illustrated example, each notifier program's event class includes three different events. These events may be represented by three corresponding bits. Additionally, one or more conditions may be represented by the notification parameter. In this example, there is a "stay resident" condition, explained below, yielding a total of four bits. Thus, a notification parameter may be represented by a four-bit binary number (0000 through 1111). Of course, ordinarily skilled artisans (having the benefit of this disclosure) will recognize that a greater number of events and conditions may be represented by using a longer notification parameter and/or a different scheme of digitally representing these items.

Dictionary

In the illustrated example, without any intended limitation, the meaning of the notification parameters is contained in a diction any 112. TABLE 2 (below) provides an example of the dictionary 112 contents.

TABLE 2

EXEMPLARY DICTIONARY 112

| NOTIFICATION PARAMETER | EXPLANATION |
|---|---|
| 0001 | NOTIFICATION FOR EVENT 1 = YES |
|  | NOTIFICATION FOR EVENT 2 = NO |
|  | NOTIFICATION FOR EVENT 3 = NO |
|  | STAY RESIDENT = NO |
| 0011 | NOTIFICATION FOR EVENT 1 = YES |
|  | NOTIFICATION FOR EVENT 2 = YES |
|  | NOTIFICATION FOR EVENT 3 = NO |
|  | STAY RESIDENT = NO |
| 0100 | NOTIFICATION FOR EVENT 1 = NO |
|  | NOTIFICATION FOR EVENT 2 = NO |
|  | NOTIFICATION FOR EVENT 3 = YES |
|  | STAY RESIDENT = NO |
| 0101 | NOTIFICATION FOR EVENT 1 = YES |
|  | NOTIFICATION FOR EVENT 2 = NO |
|  | NOTIFICATION FOR EVENT 3 = YES |
|  | STAY RESIDENT = NO |
| 0110 | NOTIFICATION FOR EVENT 1 = YES |
|  | NOTIFICATION FOR EVENT 2 = YES |
|  | NOTIFICATION FOR EVENT 3 = YES |
|  | STAY RESIDENT = NO |
| ... | ... |
| 1111 | NOTIFICATION FOR EVENT 1 = YES |
|  | NOTIFICATION FOR EVENT 2 = YES |
|  | NOTIFICATION FOR EVENT 3 = YES |
|  | STAY RESIDENT = YES |

In this example, each notification parameter comprises a different four-bit number, which corresponds to a predefined combination of desired events and the "stay resident" condition. The use of notification parameters is discussed in greater detail below.

Exemplary Digital Data Processing Apparatus

Figure 2:
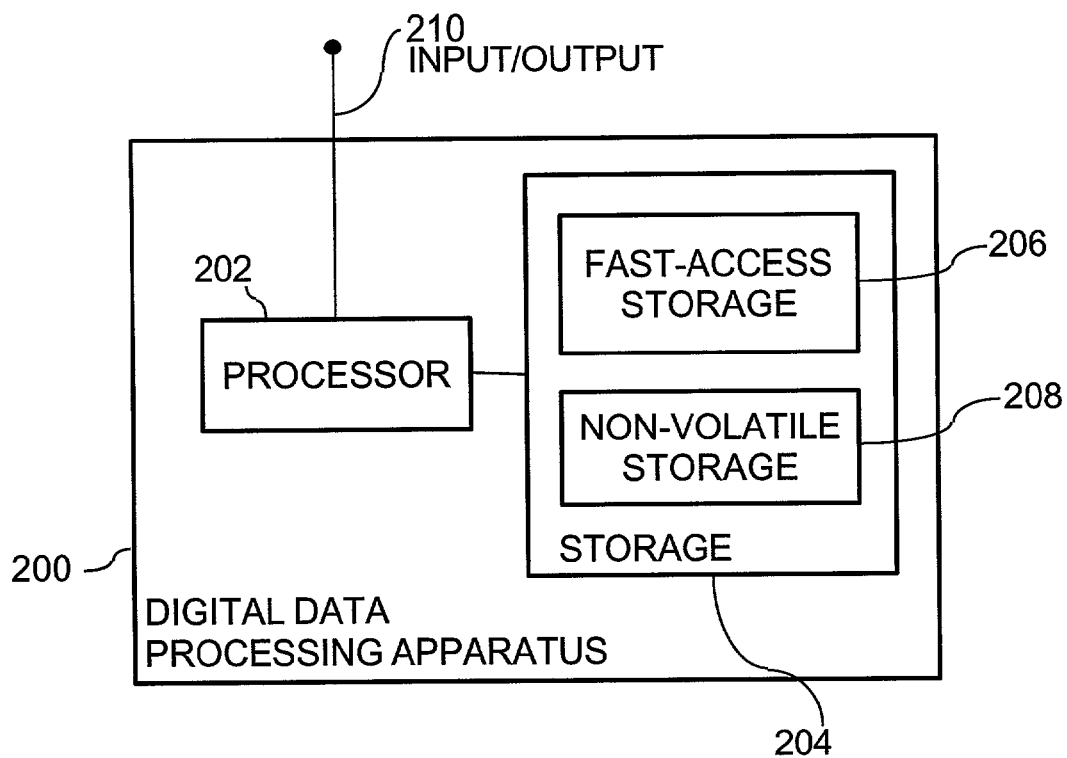
FIG. 2 is a block diagram of a digital data processing machine according to the invention.

As mentioned above, the notification manager 102, requester programs 108, and notifier programs 104 may be implemented in various forms. As one example, the these components may be implemented by digital data processing apparatuses, by a common digital data processing apparatus, or a variation thereof. For ease of illustration, the following example describes a single processing apparatus implementing all of the components 102, 108, 104. Namely, FIG. 2 illustrates the hardware components and interconnections of the digital data processing apparatus 200.

The apparatus 200 includes a processor 202, such as a microprocessor or other processing machine, coupled to a storage 204. In the present example, the storage 204 includes a fast-access storage 206, as well as nonvolatile storage 208. The fast-access storage 206 may comprise random access memory ("RAM"), and may be used to store the programming instructions executed by the processor 202. The nonvolatile storage 208 may comprise, for example, one or more magnetic data storage disks such as a "hard drive", a tape drive, or any other suitable storage device. The apparatus 200 also includes an input/output 210, such as a line, bus, cable, electromagnetic link, or other means for the processor 202 to exchange data with other hardware external to the apparatus 200.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204 may be provided on-board the processor 202, or even provided externally to the apparatus 200.

Logic Circuitry

In contrast to the digital data processing apparatus discussed above, a different embodiment of the invention uses logic circuitry instead of computer-executed instructions to implement some or all of the notification manager 102, requester programs 108, and notifier programs 104. Depending upon the particular requirements of the application in the areas of speed, expense, tooling costs, and the like, this logic may be implemented by constructing an application-specific integrated circuit ("ASIC") having thousands of tiny integrated transistors. Such an ASIC may be implemented with CMOS, TTL, VLSI, or another suitable construction. Other alternatives include a digital signal processing chip ("DSP"), discrete circuitry (such as resistors, capacitors, diodes, inductors, and transistors), field programmable gate array ("FPGA"), programmable logic array ("PLA"), and the like.

Exemplary Application

Although the system 100 may be implemented in a variety of different application contexts, one illustrative application is a wireless telephone. Some illustrative events 106 include ringing of the telephone, connection of the telephone to a network, receipt of short message service (SMS) data. An exemplary notifier programs 104 include a telephony application program interface (TAPI). In this application, the notification manager 102 is provided by a microprocessor, the map 110 is present in changeable memory such as battery-backed RAM, and the dictionary 112 is present in read only memory such as EPROM or other storage amenable to flash upgrade.

OPERATION

Having described the structural features of the present invention, the method aspect of the present invention will now be described. As mentioned above, the method aspect of the invention generally involves event detection and alert systems implemented in computer software, one embodiment of which is an extensible event notification system that detects certain events, and notifies requester programs that have registered for such notification.

Signal-Bearing Media

In the context of FIG. 1, such a method may be implemented, for example, by operating the notification manager 102, as embodied by a digital data processing apparatus 200, to execute a sequence of machine-readable instructions. These instructions may reside in various types of signal-bearing media. In this respect, one aspect of the present invention concerns signal-bearing media embodying a program of machine-readable instructions executable by a digital data processor to react to certain predefined events by notifying requestor programs that have registered for such notification.

Figure 3:
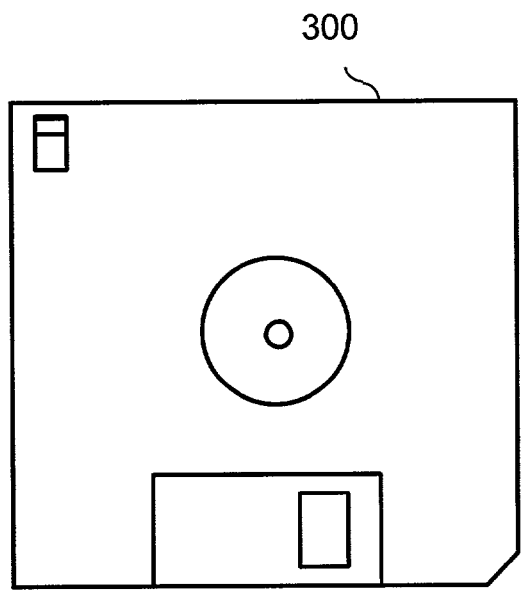
FIG. 3 shows an exemplary signal-bearing medium according to the invention.

This signal-bearing media may comprise, for example, RAM (not shown) contained within the notification manager 102, as represented by the fast-access storage 206. Alternatively, the instructions may be contained in another signal-bearing media, such as a magnetic data storage diskette 300 (FIG. 3), directly or indirectly accessible by the processor 202. Whether contained in the storage 206, diskette 300, or elsewhere, the instructions may be stored on a variety of machine-readable data storage media. Some examples include as direct access storage (e.g., a conventional "hard drive", redundant array of inexpensive disks ("RAID"), or another direct access storage device ("DASD")), serial-access storage such as magnetic or optical tape, electronic read-only memory (e.g., ROM, EPROM, or EEPROM), optical storage (e.g., CD-ROM, WORM, DVD, digital optical tape), paper "punch" cards, or other suitable signal-bearing media In an illustrative embodiment of the invention, the machine-readable instructions may comprise software object code, compiled from a language such as "C," etc.

Logic Circuitry

In contrast to the signal-bearing medium discussed above, the method aspect of the invention may be implemented using logic circuitry, without using a processor to execute instructions. In this embodiment, the logic circuitry may be used to implement some or all of the requester programs 108, notifier programs 104, and notification manager 102, to carry out the operations of the invention. The logic circuitry may be implemented using many different types of circuitry, as discussed above.

Overall Sequence of Operation

Figure 4:
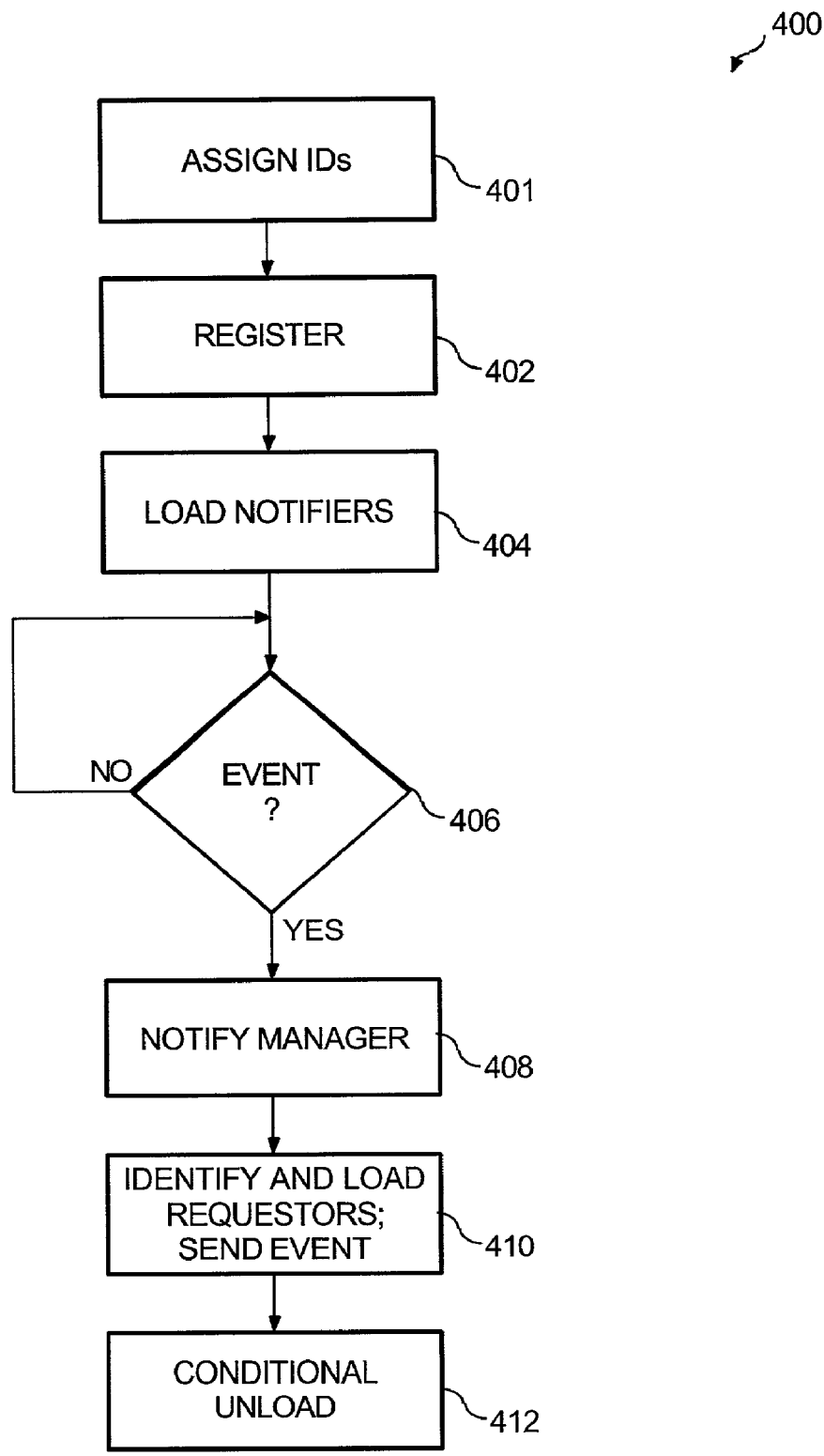
FIG. 4 is a flowchart illustrating an operational sequence for the extensible event notification system of the invention.

FIG. 4 shows a sequence 400 to illustrate an example of an operating sequence for an extensible event notification system. Broadly, this sequence serves to detect certain events and notify requestor programs 108 that have registered for such notification. For ease of explanation, but without any intended limitation, the example of FIG. 4 is described in the context of the system 100 described above.

In step 401, IDs 108a-108c are assigned to the requestor programs 108 and IDs 104a-104c are assigned to the notifier programs 104. This step may be performed by a human designer of the system 100, by the notification manager 102, or another suitable component. The IDs may be stored with the respective programs 104, 108 as shown, or stored in another location accessible to the programs 104, 108.

In step 402, one or more requester programs 108 register to receive notification of certain events. In each case, registration involves a registration program 108 submitting a registration request to the notification manager 102. A registration request includes (1) an identification of the requestor program 108, such as the requester program's ID 108a-108d, and (2) the ID 104a-104c or other identification of the notifier program 104 that corresponds to the class that includes the event(s) for which notification is desired. Optionally, the request may include a notification parameter, such as explained above in conjunction with TABLE 2. Alternatively, the requestor programs 108 may use a different representation of events and conditions, where the notification parameters are only used internally by the notification manager 102; in this event, the notification manager 102 translates the requestor programs' s notification preferences into the representative notification parameter using the dictionary 112 during the registration process (step 402). TABLE 3, below, shows the contents of an exemplary registration request.

TABLE 3

CONTENTS OF EXEMPLARY REGISTRATION REQUEST
REGISTRATION REQUEST

REQUESTOR PROGRAM ID = 1111111111111111111111111111111
NOTIFIER PROGRAM ID = 0000000000000000000000000000000
NOTIFICATION PARAMETERS = 1001

Although not separately shown for ease of description, the requestor programs 108 may initially register, and/or repeat registration, later in the sequence 400 as suits the operating requirements of those registration programs 108. Furthermore, in a different embodiment, registration may be performed by a different entity on behalf of a requestor program 108. Such an entity may be a different program (e.g., registration coordinator), a human programmer, etc.

Responsive to the registration request of step 402, the notification manager 102 processes that request by storing the contents of the request in the map 110. In the illustrated example, the notification manager 102 stores the requestor-ID, notifier-ID, and notification parameter of the current registration request. After step 402, the notification manager 102 activates the notifier program 104 involved in the current registration request. This may be performed, for example, by loading the notifier program 104 into memory. Now active, this notifier program 104 operates to sense the events of its class (step 406). When the notifier program 104 senses any events within its class, it alerts the notification manager 102 (step 408). This may be performed, for example, by passing a message to the notification manager 102, causing a hardware interrupt, setting a local flag detectable by the notification manager 102, and responding to polling of the notification manager 102.

In response, the notification manager 102 consults the map 110 to identify all requester programs 108 that have submitted registration requests concerning the alerting notifier program (step 410). Also in step 410, the manager 102 then proceeds to activate the identified requester programs, such as by loading them into memory, and also passes the activated requestor programs an indication of the event that has occurred.

In step 412, the notification manager 102 monitors the activated requester program and, when the requester program becomes inactive, the notification manager 102 deactivates it, by unloading it from memory, terminating, or otherwise ending the program. If the requestor program is registered with notification parameters that include a "stay resident" condition, the notification manager 102 aborts the deactivation of the requester program, thus permitting the program to continue running.

OTHER EMBODIMENTS

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated. Additionally, ordinarily skilled artisans will recognize that operational sequences must be set forth in some specific order for the purpose of explanation and claiming, but the present invention contemplates various changes beyond such specific order.

What is claimed is:

1. A computer implemented method for event notification for a computer wherein each event is local to said computer, and each event class being associated with a respective notifier program, each notifier program responsive to occurrence of events of a corresponding event class by detecting and transmitting notification of an occurrence of a corresponding event, the method comprising:

receiving, at a notification manager of said computer, a plurality of event registration requests, each for a requesting program of said computer when the requesting program is loaded in memory and when the requesting program is not loaded in memory, each registration request comprising:

a first identifier identifying the requesting program; and
a second identifier identifying one of the notifier programs;
responsive to each registration request, storing, by the notification manager, the first and second identifiers in a map, wherein the map includes a notification parameter which collects all notification information for each of the plurality of event registration requests whether notification for the requesting program is indicated;
activating each notifier program identified in the map;
responsive to receiving notification from a particular one of said notifier programs after detection of an occurred event, performing by the notification manager, steps comprising:
accessing the map to identify all requesting programs having submitted registration requests concerning the particular one of the notifier programs; and
activating the identified requestor programs and transmitting to each a representation of the occurred event.

2. The method of claim 1, further comprising:
unloading at least one of the requesting programs.

3. The method of claim 1, further comprising:
for each activated requesting program, determining whether the requesting program has submitted a stay-resident request, and if not, deactivating the requesting program.

4. The method of claim 1, wherein one or more of the registration requests further includes characteristics of desired event notification, comprising:
selecting a notification;
wherein
the operations responsive to notification of an event from a notifier program further include the notification manager accessing the map to identify, for each requesting program having submitted a registration request concerning the notifier program, the notification parameter representative of the desired character of notification, and
the transmission of a representation of the occurred event to the identified requestor programs is conducted in accordance with any applicable notification parameter.

5. The method of claim 4, the notification parameters represented by bit mask, each bit having a different preassigned significance.

6. The method of claim 4, the submitting operation being performed by the requesting programs.

7. The method of claim 4, wherein the operations further comprise initially associating IDs with each requesting program and notifier program, and wherein said identifications of the notifier programs and requesting program are provided by the IDs.

8. A computer readable storage medium storing instructions thereon, which when executed by a computer, causes said computer to perform the steps of:
receiving a plurality of event registration requests, each for a requestor program requesting notification of events of a particular event type when the requestor program is loaded in memory and when the requestor program is not loaded in memory;
and each event class being associated with a respective notifier program, each notifier program responsive to occurrence of events of a corresponding event class by detecting and transmitting notification of an occurrence of a corresponding event, each of the plurality of event registration requests comprising:
an identification of the requestor program; and
an identification of one of the notifier programs;
responsive to each registration request, storing said identifications of said requestor and notifier programs in a map, wherein the map includes a notification parameter which collects all notification information for each of the plurality of event registration requests whether notification for the requesting program is indicated;
activating each notifier program identified in said map;
responsive to receiving notification from a particular one of said notifier programs after detection of an occurred event, performing operations comprising:
accessing the map to identify all requestor programs having submitted registration requests concerning the particular one of the notifier programs; and
activating the identified requestor programs and transmitting to each a representation of the occurred event;
wherein each event, each requestor program, each notifier program, and the map are local to said computer.

9. An event notification apparatus for detecting events comprising: processor means for executing:
a plurality of requestor means, each requesting notification of events of a particular event type;
a plurality of notifier means, each notifier means responsive to occurrence of events of a corresponding event class and transmitting notification of an occurrence of a corresponding event;
a map means;
a notification manager means coupled to the plurality of requestor means, the plurality of notifier means, and the map means said notification manager means configured to perform steps comprising:
receiving registration requests for said plurality of requestor means when the requestor means are loaded in memory and when the requestor means are not loaded in memory, each registration request comprising:
an identification of one of said requestor means; and
an identification of one of said notifier means;
responsive to each received registration request, storing identifications of the requestor means and notifier means in said map means, wherein the map means includes notification parameter means which collects all notification information for each of the plurality requestor means whether notification for the requestor means is indicated;
activating each notifier means identified in said map means;
responsive to receiving notification from a particular one of said plurality of notifier means after detection of an occurred event, performing operations comprising:
accessing the map means to identify all requestor means having submitted registration requests concerning the particular one of said plurality of notifier means; and
activating the identified requestor means and transmitting to each a representation of the occurred event;
wherein each event, each requestor means, each notifier means, the notification manager means, and the map means are local to said event notification apparatus.

10. The apparatus of claim 9, wherein the notification manager means is further configured to unload the requestor means after said step of activating the identified requestor means and transmitting to each a representation of the occurred event.

11. The apparatus of claim 9, wherein the notification manager means is further configured to determine, after said step of activating the identified requestor means and transmitting to each a representation of the occurred event, whether the activated requestor means has submitted a stay-resident request, and if not, deactivating the requestor means.

12. A computer implemented method for event notification, comprising:

receiving a respective registration request for each requestor program desiring to be notified of an occurrence of a respective event class when the requestor program is loaded in memory and when the requestor program is not loaded in memory, wherein the registration request comprises:

a respective requestor program identifier corresponding to each requestor program, a respective notifier program identifier corresponding to one of a plurality of notifier programs in the respective event class about which the respective requestor program desires to be notified, wherein each of the plurality of notifier programs are operable to detect an occurrence of multiple predetermined events from a plurality of events, wherein each one of the multiple predetermined events differs from the other ones of the multiple predetermined events, wherein each set of multiple predetermined events defines the respective event class associated with the respective notifier program, wherein each notifier program is further operable to generate an event notification in response to detecting one of the multiple predetermined events associated with the respective event class, wherein the event notification identifies a detected one of the multiple predetermined events, and a notification preference representing at least one desired event from the multiple predetermined events associated with the respective event class;

correlating the requestor program identifier, the notifier program identifier and the notification preference for each registration request, wherein the correlation includes at least one notification parameter which collects all notification information for each of the multiple predetermined events associated with the respective event class whether notification for the requesting program is indicated;

receiving an event notification comprising a detected event;

identifying each registered requestor program to notify of the detected event, wherein each identified registered requestor program comprises any respective requestor program corresponding to any respective registration request having the respective notification preference identifying the respective desired event which matches the detected event;

activating each identified registered requestor program; and forwarding a message identifying the detected event to each identified registered requestor program.

13. The method of claim 12, wherein receiving the respective notification request comprising the notification preference further comprises referencing a dictionary associating at least one notification preference with the at least one notification parameter, identifying a corresponding notification parameter, and correlating the identified notification parameter to the respective requestor identifier and the respective notifier program identifier.

14. The method of claim 12, wherein receiving the respective notification request comprising the notification preference further comprises receiving a predetermined notification parameter.

15. The method of claim 12, wherein receiving the respective notification request comprising the notification preference further comprises receiving a condition corresponding to notifying the respective requestor program of the detected event.

16. The method of claim 15, wherein identifying further comprises identifying the condition and further comprising performing the condition with respect to the corresponding identified registered requestor program.

17. The method of claim 12, further comprising activating the respective notifier program corresponding to each respective notification program identifier.

* * * * *